4,504,761

United States Patent [19]
Triplett

[11] Patent Number: 4,504,761
[45] Date of Patent: Mar. 12, 1985

[54] VEHICULAR MOUNTED PIEZOELECTRIC GENERATOR

[76] Inventor: Charles G. Triplett, 3154 Reid Dr., Corpus Christi, Tex. 78404

[21] Appl. No.: 335,256

[22] Filed: Dec. 28, 1981

[51] Int. Cl.³ .............................................. H01L 41/08
[52] U.S. Cl. .................................... 310/800; 290/1 R; 322/3
[58] Field of Search ....................... 310/339, 800, 67 R, 310/67 A, 75 R, 75 C, 300, 311, 380; 417/229, 231, 233; 322/1, 3; 152/153, 330 R, DIG. 2, 339; 290/1 R; 180/54 R, 65 B, 65 D; 340/58; 73/146

[56] References Cited

U.S. PATENT DOCUMENTS

| 1,574,095 | 2/1926 | Jokisch | 180/65.3 |
| 2,226,453 | 12/1940 | Vretman | 152/339 |
| 4,061,200 | 12/1977 | Thompson | 180/66 B |
| 4,110,630 | 8/1978 | Hendel | 290/53 |
| 4,220,907 | 9/1980 | Pappas et al. | 322/3 |
| 4,284,535 | 8/1981 | Lal et al. | 152/330 |
| 4,330,730 | 5/1982 | Kurz et al. | 310/331 |

Primary Examiner—William M. Shoop
Assistant Examiner—D. L. Rebsch
Attorney, Agent, or Firm—G. Turner Moller

[57] ABSTRACT

A piezoelectric array is mounted on one or more tires of a motor vehicle. As the vehicle drives down the road, the tire is flexed during each revolution to distort the piezoelectric elements and generate electricity. An electric circuit delivers the energy to the electrical system of the vehicle.

4 Claims, 6 Drawing Figures

VEHICULAR MOUNTED PIEZOELECTRIC GENERATOR

This invention relates to motor vehicle mounted electrical generators and more particularly to motor vehicle mounted electrical generators utilizing the flexing of pneumatic tires to operate the generator.

More particularly, this invention relates to an electrical generator incorporated with the wheels of the vehicle and includes a plurality of piezoelectric elements which are flexed or distorted during each revolution of the wheel to generate electricity.

Attempts are often made to obtain energy from sources which were theretofore neglected to the extent that the energy was wasted. One such example is the mounting of electrical generators on the axles of locomotives to generate electricity during baking of the locomotive. Another example is found in attempts to extract energy from shock absorbers of motor vehicles as disclosed in U.S. Pat. Nos. 3,559,027; 3,981,204 and 4,032,829.

Attempts have also been made to incorporate electrical generators in the wheel of a motor vehicle as disclosed in U.S. Pat. No. 4,061,200 and France No. 2,241,699. It is this type device to which this invention is most nearly related.

In summary, this invention comprises a piezoelectric array mounted inside a pneumatic tire of a motor vehicle and flexed or distorted during each revolution of the tire. Because of the inherent nature of piezoelectric devices, distortion creates an electron flow which is, of course, electricity. The outputs of the piezoelectric devices are connected to an electric circuit having means to convert the high voltage, low amperage electricity produced by the piezoelectric devices into low voltage, high amperage electricity compatible with the electrical system of motor vehicles.

It is an object of this invention to provide an improved technique for generating energy from vehicle motion.

Another object of this invention is to provide an improved tire mounted electrical generator.

Other objects and advantages of this invention will become more fully apparent as this description proceeds, reference being made to the accompanying drawings and appended claims.

IN THE DRAWINGS

Figure 1:
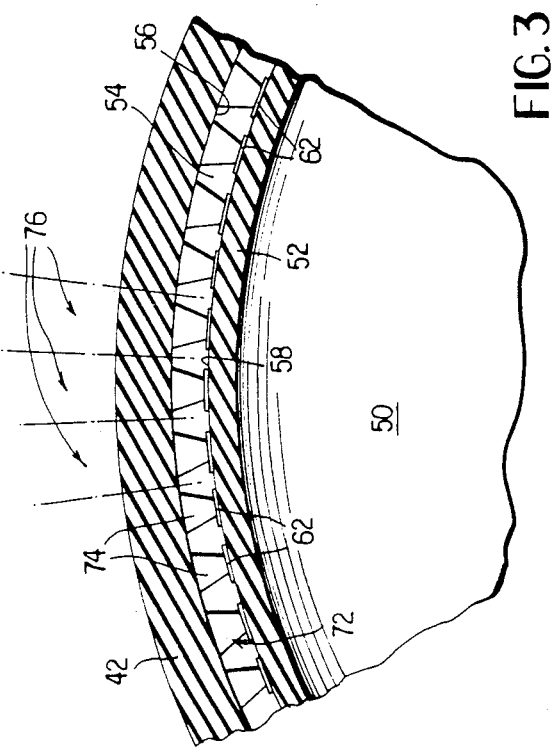
FIG. 1 is a schematic view of a motor vehicle equipped with the tire mounted electrical generator of this invention.

Referring to FIGS. 1–4, there is illustrated a motor vehicle 10 having the customary body 12 supported by a plurality of wheel and tire assemblies 14 for movement along a roadway 16. The vehicle 10 includes an internal combustion engine 18 in driving relation with one or more of the wheel and tire assemblies 14. The motor vehicle 10 also includes a battery 20 connected to an electrical system 22 of the vehicle 10 through suitable leads 24, 26 secured to the negative and positive terminals of the battery 16 in a conventional manner.

The vehicle 10 may be provided with an alternator or generator 28 driven by a belt 30 or other suitable arrangement from the engine 18 for supplying part of the electrical requirements of the electrical system 22 and/or to maintain the battery 20 in a fully charged condition. Preferably, the alternator 28 is of the demand type, i.e. when there is no requirement for electricity in the system 22 or in the battery 20, there is no load on the alternator 28 and it rotates freely in its bearings. It is preferred, however, that all or a substantial part of the electricity consumed in the system 22 and used to charge the battery 20 be derived from an electrical generator 32 incorporated in the wheel and tire assemblies 14.

The wheel and tire assemblies 14 each include a rigid, usually metallic wheel or rim 34 having a central hub 36 and mounting a pneumatic tire 38 thereon in any suitable fashion. As shown best in FIGS. 2 and 3, the tire 38 is generally of two piece construction and includes an outer generally U-shaped section 40 having a generally cylindrical tread portion 42 and a pair of generally annular depending side walls 44 bonded or otherwise secured to a pair of circular beads 46 received by the wheel or rim 34.

The tire 38 also includes an inner generally U-shaped section 48 having a pair of annular depending side walls 50 bonded to the beads 46 and a generally cylindrical inner portion 52 generally parallel to and spaced from the tread portion 42 to define a chamber 54 receiving many of the components of the electrical generator 32. As is seen most clearly in FIGS. 2 and 3, the chamber 54 is largely defined by the undersurface 56 of the outer U-shaped section 40 and the upper surface 58 of the inner U-shaped section 48.

The electrical generator 32 associated with each of the wheel and tire assemblies 14 comprises a piezoelectric array 60 including a multiplicity of piezoelectric elements or crystals 62 bonded to the upper or outer surface 58 of the inner wall 52. Each of the piezoelectric elements 62 includes a pair of leads 64, 66 connected to branch electrical wires 68, 70 as will be pointed out more fully hereinafter.

Figure 2:
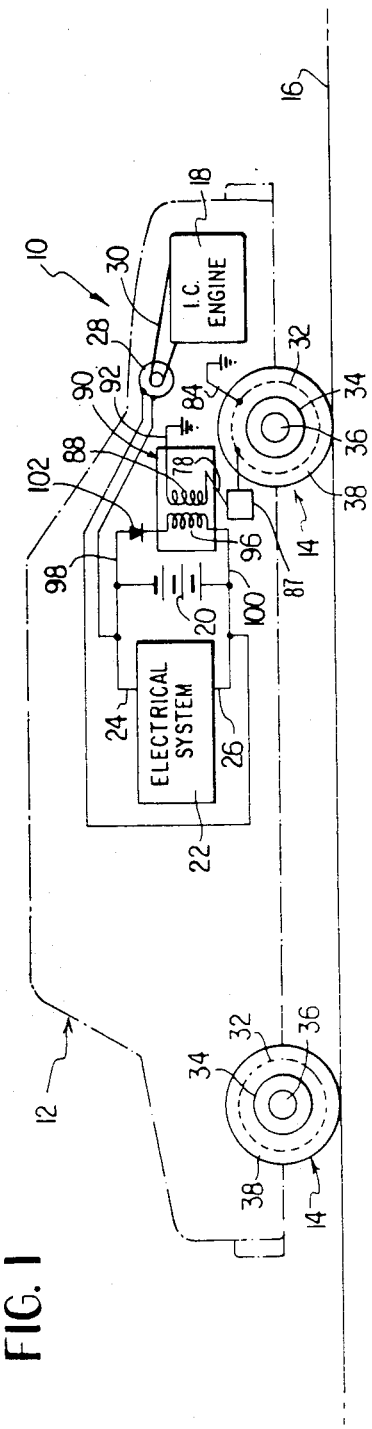
FIG. 2 is an enlarged cross sectional view of one of the tires of FIG. 1, taken substantially along line 2—2 thereof as viewed in the direction indicated by the arrows and illustrating a transverse cross sectional view of the tire.
Figure 3:
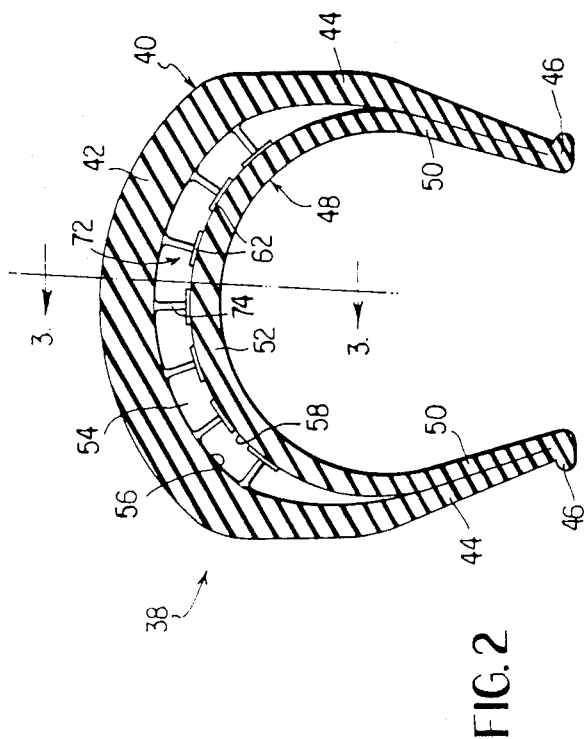
FIG. 3 is a partial cross sectional view of FIG. 2 taken substantially along line 3—3 thereof as viewed in the direction indicated by the arrows and illustrating a partial longitudinal cross sectional view of the tire of FIG. 2.

The electrical generator 32 also comprises means 72 for stressing or distorting the piezoelectric elements 62 during rotation of the wheel and tire assemblies 14. As illustrated in FIGS. 2 and 3, the stressing means 72 comprise a plurality of projections 74 integral to or bonded to the undersurface 56 of the tread portion 42. The projections 74 abut or juxtapose the piezoelectric elements 62 so that movement of the vehicle 10 along the roadway 16 causes each of the projections or depressors 74 to contact and stress its associated piezoelectric element 62 once during each revolution of the wheel and tire assembly 14.

One of the difficulties in using piezoelectric elements, such as the elements 62, in an electrical generator incorporated in a tire is that piezoelectric crystals are bidirectional in the sense that, when stressed, they produce electron flow and, when subjected to electron flow, internal stresses are produced. Accordingly, if one were to install a plurality of piezoelectric elements in a tire and connect all of the outputs of the elements to a wire, little electron flow wound be experienced in the output wire since the electrons produced by the elements being stressed could be absorbed by elements not being stressed.

To obviate this possibility, the piezoelectric elements 62 are disposed in bands or banks 76 located in circumferentially spaced sections along the periphery of the tire 38 so that electron flow produced by any piezoelectric element 62 being stressed is delivered to an output wire 78 rather than being delivered to an unstressed piezoelectric element 62. It will accordingly be seen that substantially all of the piezoelectric elements 62 in any one bank 76 are stressed substantially simultaneously. It will also be seen that all of the piezoelectric elements 62 in one of the banks 76 are in parallel as opposed to series relation. Accordingly, all of the output leads 64 of the piezoelectric crystals 62 in any one circumferentially spaced bank 76 are connected to a common branch wire 68 which is connected through a diode 80 to the output wire 78. Similarly, the input lead 66 of each of the piezoelectric crystals 62 in each circumferentially spaced band 76 is connected to a common branch wire 70, connected through a diode 82 to an input wire 84 which leads to a ground connection 86, such as a component of the vehicle body 12.

The output and input wires 78, 84 of the piezoelectric array 60 inside the tire 38 are insulated from the wheel 32 and extend through the hub 34 in any suitable fashion, as by the use of commutator rings or the like (not shown).

The output wire 78 connects to a dc-ac converter 87 which in turn connects to a high voltage coil 88 of a transformer 90. The high voltage coil 88 has an output lead 92 which is conveniently secured to a ground connection 94 on the vehicle body 12. The transformer 90 also includes a low voltage coil 96 connected by a pair of leads 98, 100 to the battery 20. In order to prevent the battery 20 from continuously discharging through the transformer 90, a diode 102 is provided in one of the leads 98, 100.

Operation of the vehicle 10 and particularly its electrical generator 32 should now be apparent. As the vehicle 10 is propelled along the roadway 16, one or more of the circumferentially spaced bands 76 on each of the wheel and tire assemblies 14 juxtaposes the roadway 16. Accordingly, part of the weight of the vehicle 10 momentarily passes through the projections or depressors 74 to engage or contact the piezoelectric crystals 62 in the band or bands 76 being stressed. As the piezoelectric elements 62 are being stressed, an electron flow is generated out of the outputs 64 thereof and through the output branches 68 to the output wire 78 of the generator 32. The electricity so produced passes through the transformer 90 to produce an electron flow in the low voltage coil 96 which is delivered to the battery 20 and electrical system 22 of the vehicle 10.

Figure 5:
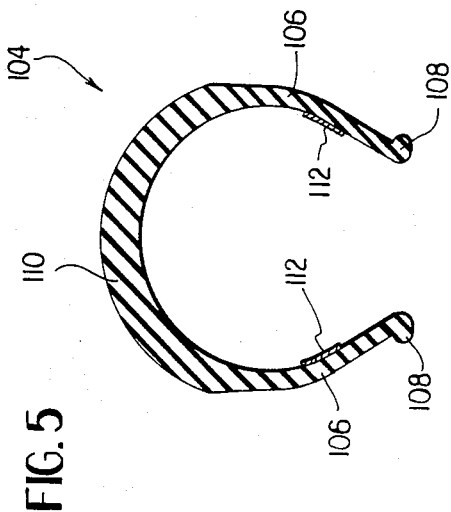
FIG. 5 is a cross sectional view, similar to FIG. 2, illustrating another embodiment of this invention.
Figure 6:
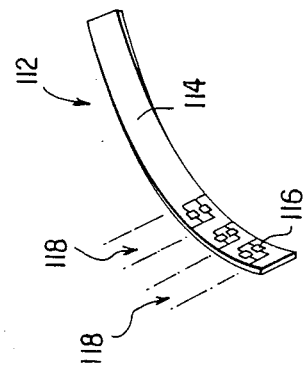
FIG. 6 is an isometric view of the piezoelectric assembly of FIG. 5 prior to mounting on the tire thereof.
Figure 4:
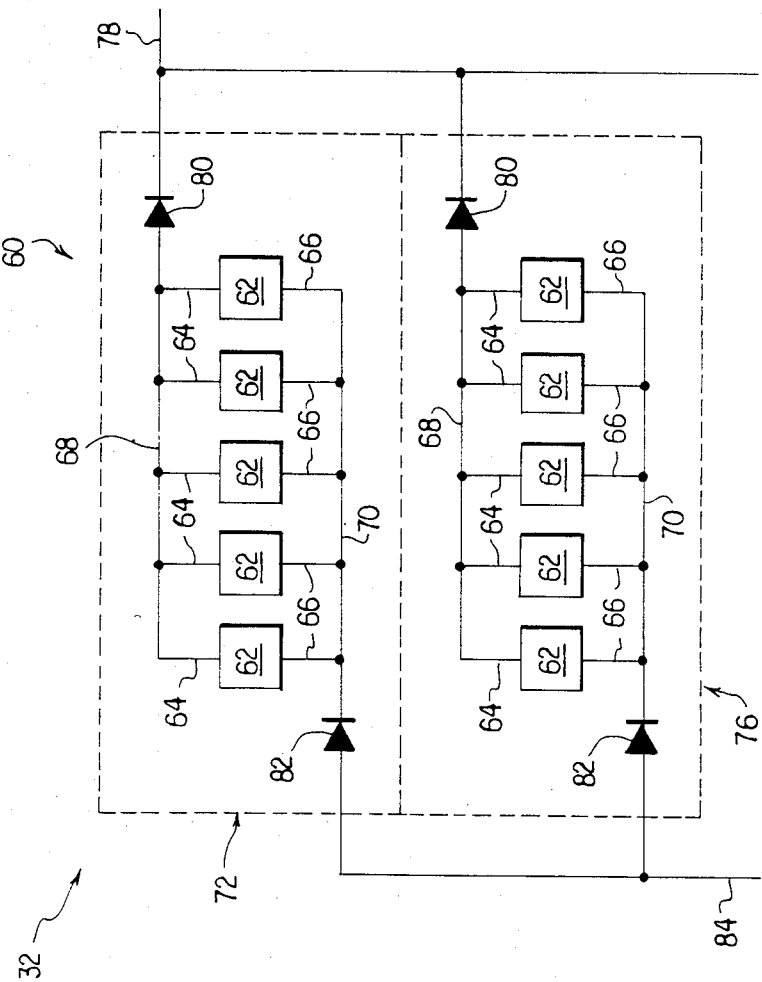
FIG. 4 is a schematic electrical diagram of the piezoelectric array inside the tires of FIGS. 2 and 3.

Referring to FIGS. 5 and 6, another embodiment of this invention is illustrated in conjunction with a tire 104 of more conventional design including a pair of annular side walls 106 bonded to a pair of circular beads 108 and having a generally cylindrical tread section 110. Rather than incorporating the piezoelectric array in conjunction with the cylindrical or road contacting part of the tire, the embodiment of FIGS. 5 and 6 incorporates one or more piezoelectric arrays 112 bonded to the side walls 106. As shown best in FIG. 6, each of the piezoelectric arrays 112 includes an arcuate base 114 incorporating thereon a plurality of piezoelectric elements 116 arranged in circumferentially spaced bands 118. The base 114 is secured to the interior of the side wall 106 in any suitable fashion, as by the use of adhesives. It will accordingly be seen that the embodiment of FIGS. 5 and 6 contemplates a tire of greater simplicity which utilizies the flexure of the side walls to distort the piezoelectric elements. In all other respects, operation of the embodiment of FIGS. 5 and 6 is identical to that of the embodiment of FIGS. 2 and 3.

Although the invention has been disclosed in its preferred forms with a certain degree of particularity, it is understood that the present disclosure of those forms is only by way of example and that numerous changes in the details of construction and combination and arrangement of parts may be resorted to without departing from the spirit and scope of the invention.

I claim:

1. Apparatus for generating electricity comprising
   a vehicle having an electrical system including a battery and a plurality of assemblies including a wheel and a tire having a rubberoid casing comprising a first annular band and a second annular band having a plurality of projections thereon juxtaposed to the first band for movement theretoward in response to rolling movement of the tire; and
   means for generating electricity in response to movement of the vehicle along a roadway including
      a multiplicity of piezoelectric elements bonded to the first band and juxtaposed to the projections for engagement therewith during rolling movement of the tire for generating electricity in response to rolling movement of the tires relative to the roadway; and
   means interconnecting the piezoelectric elements in circuit with the battery for delivering electrical energy generated by the piezoelectric elements to the battery, said means having output wires included.

2. The apparatus of claim 1, wherein the vehicle further comprises an internal combustion engine and an alternator driven by the engine and connected in circuit with the battery, the alternator being of the demand type.

3. The apparatus of claim 1 wherein the piezoelectric elements are arranged in parallel.

4. The apparatus of claim 1 wherein the piezoelectric elements are arranged in bands circumferentially spaced about the tire, each of the bands having an output wire including a diode therein.

* * * * *